(12) United States Patent
Alexander et al.

(10) Patent No.: US 11,648,827 B2
(45) Date of Patent: May 16, 2023

(54) PNEUMATIC SHADE

(71) Applicant: GM GLOBAL TECHNOLOGY OPERATIONS LLC, Detroit, MI (US)

(72) Inventors: Paul W. Alexander, Ypsilanti, MI (US); Jeff E. Nasca, Bloomfield Township, MI (US); Adam R. Ballard, Chesterfield, MI (US); Koray Benli, Ann Arbor, MI (US); Jonathan E. Luntz, Ann Arbor, MI (US); Laura Alejandra Giner Munoz, Ann Arbor, MI (US); Diann Brei, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 503 days.

(21) Appl. No.: 16/709,880

(22) Filed: Dec. 10, 2019

(65) Prior Publication Data

US 2021/0170837 A1 Jun. 10, 2021

(51) Int. Cl.
*B60J 3/00* (2006.01)
*B60J 1/20* (2006.01)

(52) U.S. Cl.
CPC ........... *B60J 1/2019* (2013.01); *B60J 1/2075* (2013.01); *B60J 3/005* (2013.01)

(58) Field of Classification Search
CPC ...... B60J 1/2019; B60J 1/2075; B60J 1/2091; B60J 3/005; B60J 7/0023; E06B 9/262; E06B 2009/2625; E06B 2009/2627; E06B 9/38; E06B 9/386; E06B 9/24
See application file for complete search history.

(56) References Cited

U.S. PATENT DOCUMENTS

| 604,329 | A | * | 5/1898 | Judge | 160/167 R |
|---|---|---|---|---|---|
| 3,151,663 | A | * | 10/1964 | Bohner | B63B 19/14 |
| | | | | | 114/344 |
| 3,599,702 | A | * | 8/1971 | Bedard | E06B 3/48 |
| | | | | | 160/44 |
| 3,910,338 | A | * | 10/1975 | Pontoppidan | E06B 3/481 |
| | | | | | 160/199 |

(Continued)

FOREIGN PATENT DOCUMENTS

| DE | 4426789 A1 | 2/1995 |
|---|---|---|
| GB | 2121856 A | 1/1984 |

OTHER PUBLICATIONS

Germany Office Action Issued in Germany Application No. 10 2020 129 094.2 dated Mar. 17, 2022; 4 Pages.

*Primary Examiner* — Abe Massad
(74) *Attorney, Agent, or Firm* — Cantor Colburn LLP

(57) ABSTRACT

A pneumatic shade includes a plurality of slats, a plurality of first fold members, and a plurality of second fold members. Each slat is elongated and includes and spans laterally between opposite longitudinal edges. Each of the first- and second-fold members are elongated and co-extend longitudinally with the slats. Each first fold member is attached to longitudinal edges of the respective adjacent slats. Each second fold member is attached to longitudinal edges of respective adjacent slats and are alternatingly orientated with respect to the first fold members such that each slat spans laterally between a respective first fold member and second fold member. Each of the first fold members and the second fold members are adapted to move between a folded state and an unfolded state upon application of pressurized air.

6 Claims, 5 Drawing Sheets

(56) References Cited

U.S. PATENT DOCUMENTS

| | | | | |
|---|---|---|---|---|
| 4,038,788 | A * | 8/1977 | Claessens | E04B 7/166 |
| | | | | 52/2.17 |
| 4,506,720 | A * | 3/1985 | Iwanicki | E06B 9/24 |
| | | | | 160/121.1 |
| 4,880,045 | A * | 11/1989 | Stabler | E06B 9/327 |
| | | | | 160/207 |
| 5,085,473 | A * | 2/1992 | Yang | B60J 1/2069 |
| | | | | 296/141 |
| 5,658,037 | A * | 8/1997 | Evans | B60J 7/085 |
| | | | | 160/311 |
| 5,911,467 | A * | 6/1999 | Evans | B60J 7/085 |
| | | | | 296/100.15 |
| 7,748,169 | B2 * | 7/2010 | Cote | E06B 9/02 |
| | | | | 52/406.1 |
| 9,773,437 | B2 * | 9/2017 | Amiram | B60J 3/0278 |
| 2016/0318377 | A1 * | 11/2016 | Patin | B60J 1/2091 |
| 2019/0003251 | A1 * | 1/2019 | Amory | E06B 9/322 |

* cited by examiner

PNEUMATIC SHADE

INTRODUCTION

The subject disclosure relates to a shade, and more particularly, to a pneumatic window shade.

Traditional sun shades, such as those used in vehicles, are known to be manual or electrically actuated. The electrically actuated shades are convenient for the user; however, such shades are often expensive to manufacture, difficult to package, and may have a less than ideal, robust, design.

Accordingly, it is desirable to provide actuated shades that have improved packaging, are less expensive, and more robust.

SUMMARY

A pneumatic shade according to one exemplary, non-limiting, embodiment of the present disclosure includes a plurality of first slats, a plurality of first fold members, and a plurality of second fold members. Each first slat is elongated and spans laterally between opposite longitudinal edges. The plurality of first fold members is elongated and co-extend longitudinally with the plurality of first slats. Each first fold member is attached to longitudinal edges of respective adjacent first slats of the plurality of first slats. The plurality of second fold members is elongated and co-extend longitudinally with the plurality of first slats. Each second fold member is attached to longitudinal edges of respective adjacent first slats of the plurality of first slats and are alternatingly orientated with respect to the plurality of first fold members such that each first slat spans laterally between a respective first fold member and second fold member. Each of the plurality of first fold members and the plurality of second fold members are adapted to move between a folded state and an unfolded state upon application of pressurized air.

In addition to the foregoing embodiment, the plurality of first slats are in an accordion-like retracted position when the plurality of first fold members and the plurality of second fold members are in the folded state and are in an extended position when the plurality of first fold members and the plurality of second fold members are in the unfolded state.

In the alternative or additionally thereto, in the foregoing embodiment, at least one of the plurality of first fold members and the plurality of second fold members each include outer and inner membranes defining an air chamber.

In the alternative or additionally thereto, in the foregoing embodiment, the pneumatic shade includes an air conduit in fluid communication with each air chamber.

In the alternative or additionally thereto, in the foregoing embodiment, the air conduit is disposed normal to the plurality of first slats and is attached to each slat of the plurality of first slats.

In the alternative or additionally thereto, in the foregoing embodiment, at least one of the outer and inner membranes are resiliently flexible and adapted to exert a force arranged to bias the fold member toward the folded state.

In the alternative or additionally thereto, in the foregoing embodiment, each slat of the plurality of first slats include a magnet adapted to retain the plurality of first slats in the accordion-like retracted position.

In the alternative or additionally thereto, in the foregoing embodiment, the pneumatic shade includes a first guide rail, a second rail, a plurality of first rollers, and a plurality of second rollers. The second guide rail is spaced from the first guide rail. The plurality of first fold members and the plurality of second fold members extend longitudinally between the first and second guide rails. Each first roller of the plurality of first rollers is rotationally engaged to a first end portion of each respective one of the plurality of first fold members and the plurality of second fold members. Each first roller is further adapted to roll upon the first guide rail. Each second roller of the plurality of second rollers is rotationally engaged to an opposite second end portion of each respective one of the plurality of first fold members and the plurality of second fold members. Each second roller is adapted to roll upon the second guide rail.

In the alternative or additionally thereto, in the foregoing embodiment, the pneumatic shade includes inflatable bellows adapted to be in the unfolded state when inflated, and in the folded state when deflated. The inflatable bellows include the plurality of first slats and a plurality of second slats. The plurality of first slats and the plurality of second slats define an inflatable chamber for receipt of pressurized air.

In the alternative or additionally thereto, in the foregoing embodiment, each one of the plurality of second slats is elongated and spans laterally between opposite longitudinal edges.

In the alternative or additionally thereto, in the foregoing embodiment, the pneumatic shade includes a plurality of inner fold members and a plurality of outer fold members. The plurality of inner fold members is elongated and co-extend longitudinally with the plurality of second slats. Each inner fold member is attached to longitudinal edges of respective adjacent second slats of the plurality of second slats. The plurality of outer fold members is elongated and co-extend longitudinally with the plurality of second slats. Each outer fold member is attached to longitudinal edges of respective adjacent second slats of the plurality of second slats and are alternatingly orientated with respect to the plurality of inner fold members such that each second slat spans laterally between a respective inner fold member and outer fold member. Each of the plurality of inner fold members and the plurality of outer fold members are adapted to move between the folded state and the unfolded state upon application of pressurized air.

In the alternative or additionally thereto, in the foregoing embodiment, the plurality of first fold members is a plurality of inward fold members, and the plurality of second fold members is a plurality of outward fold members. Each one of the plurality of inward fold members is aligned to a respective inner fold member of the plurality of inner fold members.

In the alternative or additionally thereto, in the foregoing embodiment, the pneumatic shaded includes a plurality of partitions, with each one of the plurality of inward fold members being attached to a respective inner fold member of the plurality of inner fold members, thereby forming a respective partition of the plurality of partitions.

In the alternative or additionally thereto, in the foregoing embodiment, the inflatable chamber includes a plurality of chamber portions, and each chamber portion is defined in-part between adjacent partitions of the plurality of partitions.

In the alternative or additionally thereto, in the foregoing embodiment, an opening is defined by and communicates through each partition of the plurality of partitions.

In the alternative or additionally thereto, in the foregoing embodiment, the pneumatic shade includes a telescoping pneumatic cylinder engaged to a leading slat of the plurality of first slats and constructed to move the plurality of first slats between the retracted and extended positions.

A pneumatic shade according to another non-limiting embodiment, includes a first membrane and a second membrane. The first membrane includes a plurality of first perimeters each defining a respective first slit of a plurality of first slits. The second membrane includes a plurality of second perimeters each defining a respective second slit of a plurality of second slits. Each first perimeter is sealed to a respective second perimeter. The first and second membranes define an air chamber. The plurality of first slits and the plurality of second slits widen upon receipt of pressurized air in the chamber, thereby forming a plurality of openings communicating through the first and second membranes.

In addition to the foregoing embodiment, the pneumatic shade includes a frame at least in-part extending about, and being engaged to, an outer periphery of the first and second membranes.

In the alternative or additionally thereto, in the foregoing embodiment, the frame completely surrounds the outer periphery.

In the alternative or additionally thereto, in the foregoing embodiment, the frame is inflatable.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
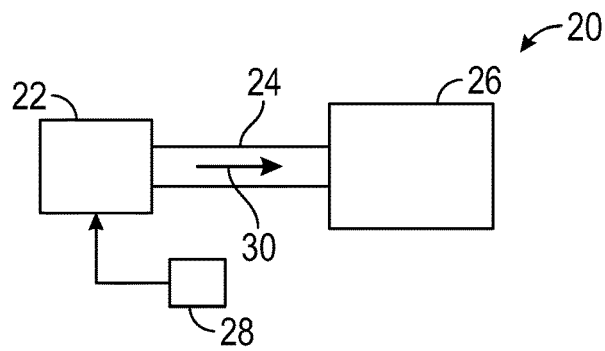
FIG. 1 is a schematic of a pneumatic shade assembly as one exemplary, non-limiting, embodiment of the present disclosure.

The following description is merely exemplary in nature and is not intended to limit the present disclosure, its application or uses. It should be understood that throughout the drawings, corresponding reference numerals indicate like or corresponding parts and features.

In accordance with an exemplary embodiment, and referring to FIG. 1, a pneumatic shade assembly 20 includes a compressed, or pressurized, air source 22, a conduit 24, a pneumatic shade 26, and a controller 28. The conduit 24 is adapted to provide compressed air (see arrow 30) from the air source 22 and to the pneumatic shade 26. In an example, the controller 28 may be a switch operated by a user and configured to actuate and/or energize the air source 22. Although not illustrated, various valve arrangements may be utilized to effect control of the pneumatic shade 26. In one embodiment, the pneumatic shade assembly 20 may be used to shade the sun, and/or provide a degree of privacy.

Figures 2, 3:
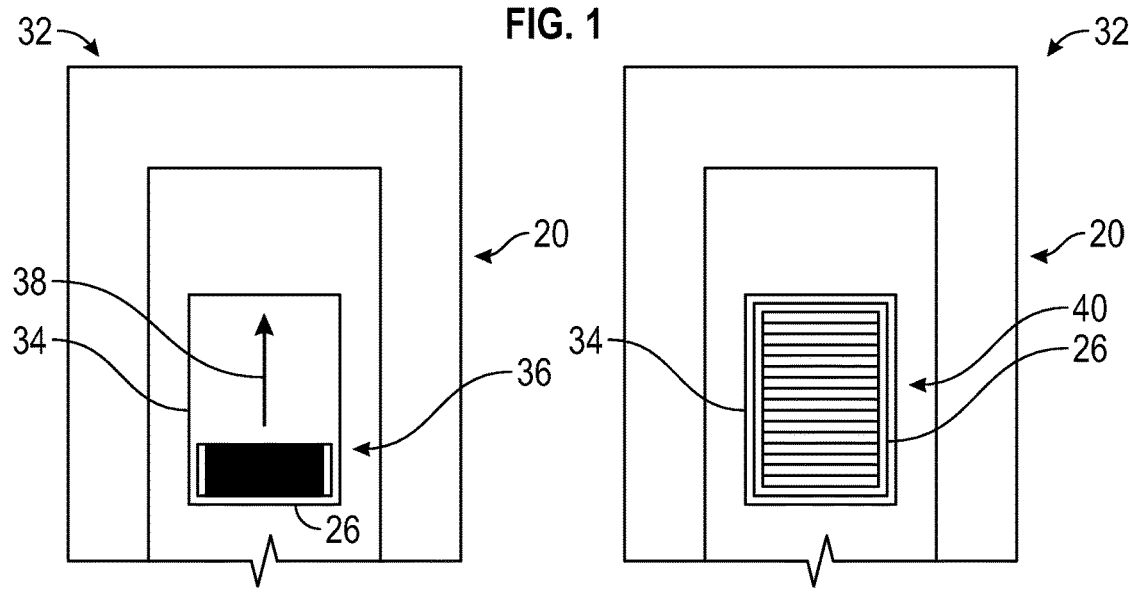
FIG. 2 is a partial top plan view of the pneumatic shade assembly applied in the application of a vehicle sunroof and illustrated in a retracted position.
FIG. 3 is a partial top plan view of the pneumatic shade assembly applied in the application of a vehicle sunroof and illustrated in an extended position.

Referring to FIGS. 2 and 3, the pneumatic shade assembly 20 may be part of a vehicle 32 with the pneumatic shade 26 generally placed in front of a vehicle window 34. In operation, the pneumatic shade 26 moves from a retracted position 36 (see FIG. 2), and in a direction (see arrow 38), to an extended position 40 (see FIG. 3) in an accordion-like manner. This movement occurs upon the application, or receipt, of the compressed air 30. In one example, the window 34 may be a vehicle sun roof. It is further contemplated and understood that the pneumatic shade assembly 20 may be applied in any application requiring shade from the sun and/or privacy, including residential home applications.

Figure 4:
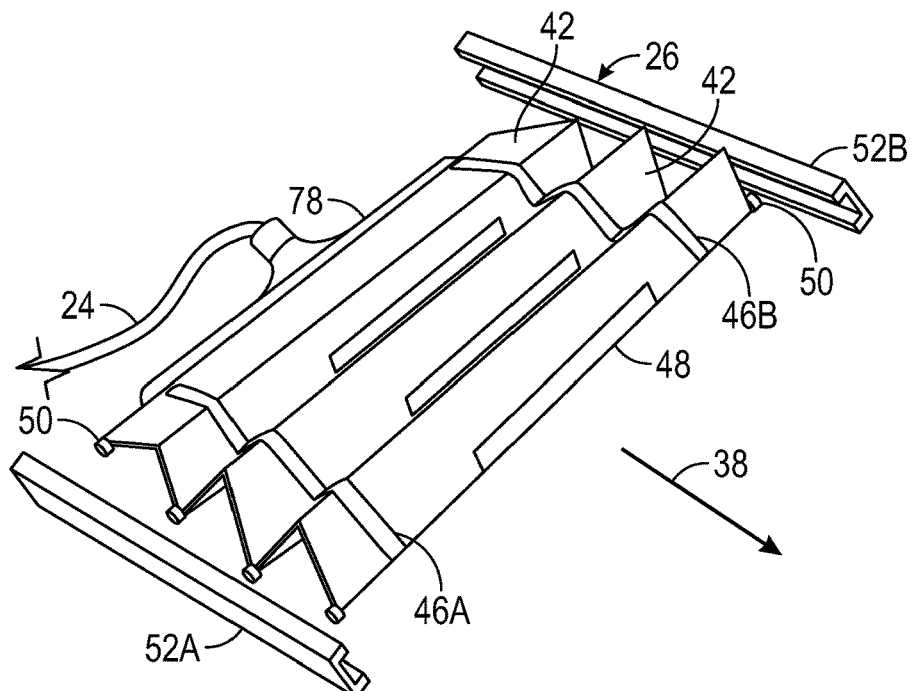
FIG. 4 is a partially disassembled perspective view of the pneumatic shade assembly.
Figure 5:
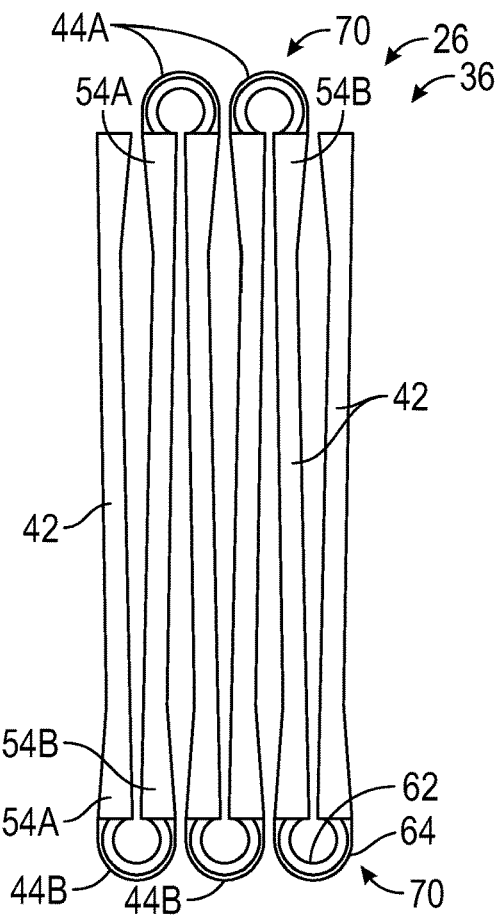
FIG. 5 is a cross section of a pneumatic shade of the pneumatic shade assembly illustrated in the retracted position.
Figure 6:
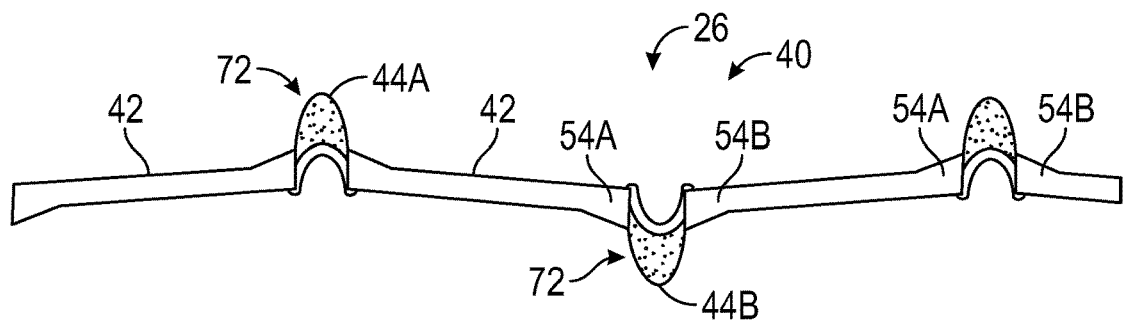
FIG. 6 is a cross section of the pneumatic shade of the pneumatic shade assembly illustrated in the extended position.

In one embodiment, and referring to FIGS. 4, 5, and 6, the pneumatic shade 26 includes a plurality of slats 42, a plurality of first fold members 44A, a plurality of second fold members 44B, at least one air conduit (i.e., two illustrated as 46A, 46B, see FIG. 4), a plurality of magnets 48, a plurality of rollers 50, and opposite, or opposing, guide rails 52A, 52B. Each slat 42 is elongated, is substantially normal to direction 38, and includes and spans laterally between opposite longitudinal edges 54A, 54B (i.e., edge segments). Each of the first fold members 44A, and each of the second fold members 44B are elongated, are substantially normal to direction 38, and are attached to, and span laterally between, edges 54A, 54B of respective, adjacent, slats 42 so that the fold members 44A, 44B longitudinally co-extend with the slats 42.

The rollers 50 are rotationally attached to opposite end portions 56A, 56B of each of the first fold members 44A, and each of the second fold members 44B (see FIG. 4). In operation, the rollers 50 attached to the end portions 56A ride upon, or within, the first guide rail 52A, and the rollers 50 attached to the end portions 56B ride upon, or within, the second guide rail 52B. The guide rails 52A, 52B are fixed, and attached, to the vehicle 32, and are proximate to respective opposite sides of the window 34. During operation, the rollers 50 position, and/or support, the shade 26, and reduce friction as the shade 26 moves between the retracted and extended positions 36, 40.

Figure 7:
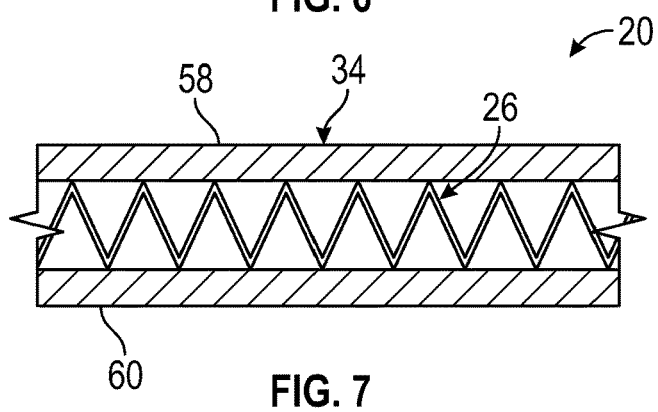
FIG. 7 is a partial cross section of another embodiment of the pneumatic shade assembly illustrated in the extended position.

Referring to FIG. 7, and in another embodiment, the pneumatic shade assembly 20 may not include the rollers 50, and instead is disposed between two panes of glass 58, 60 of the window 34. More specifically, the pneumatic shade assembly 20 includes the two panes of glass 58, 60, and the glass 58, 60 facilitates the support and protection of the pneumatic shade 26.

Figure 8:
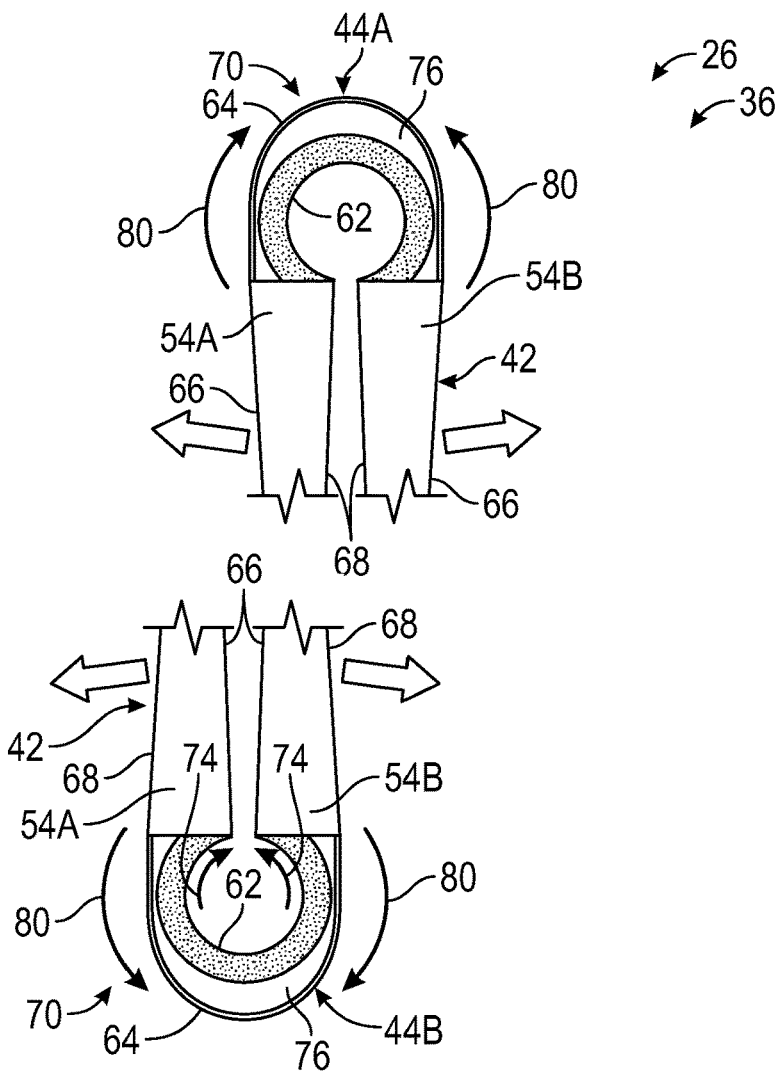
FIG. 8 is a partial, enlarged, cross section of the pneumatic shade illustrating fold members of the pneumatic shade in a folded state.

Referring to FIG. 8, each one of the first fold members 44A, and each one of the second fold members 44B, include first and second membranes 62, 64 that are resiliently flexible (i.e., rubber, synthetic rubber, etc.), may be arcuate in cross-section, are each elongated, and longitudinally co-extend with the slats 42. The first and second membranes 62, 64 span laterally between, and are attach to, the edges 54A, 54B of the respective adjacent slats 42. More specifically, the first membrane 62 of the first fold member 44A attaches to the edges 54A, 54B proximate to (e.g., congruent to) a first face 68 of each adjacent slat 42, and the second membrane 64 of the first fold member 44A attaches to the edges 54A, 54B proximate to (e.g., congruent to) an opposite second face 66 of each adjacent slat 42. Similarly, the first membrane 62 of the second fold member 44B is attached to the edges 54A, 54B proximate to (e.g., congruent to) the face 66 of each adjacent slat 42, and the second membrane 64 of the second fold member 44B attaches to the edges 54A, 54B proximate to (e.g., congruent to) the face 68 of each adjacent slat 42.

In operation of the pneumatic shade 26, the fold members 44A, 44B are in a folded state 70 (see FIGS. 5 and 8) when the pneumatic shade 26 is in the retracted position 36 and are in an unfolded state 72 (see FIG. 6) when the pneumatic shade 26 is in the extended position 40. With continued reference to FIG. 8, and in one embodiment, the cross-section of the first membrane 62 of the fold members 44A, 44B is substantially circular when in the folded state 70. Also, when in the folded state 70, the first membrane 62 is substantially in a natural state and the resiliency of the membrane 62 may facilitate the exertion of a force (i.e., see arrows 74) that biases the slats 42 toward the retracted position 36, thus away from the extended position 40.

Referring to FIGS. 4 and 8, the first and second membranes 62, 64 may, together, function as an air bladder, and include boundaries that define an air chamber 76. The air conduits 46A, 46B are supported by and may be an integral part of the slats 42 and are in fluid communication with the air chambers 76 of the fold members 44A, 44B. In operation, the air source 22 (see FIG. 1) provides pressurized air via the conduit 24 and into a manifold 78 (see FIG. 4). The manifold 78 facilitates delivery of the pressurized air into the conduits 46A, 46B, which then delivers the pressurized air to the chambers 76.

With continued operation, and as the pressurized air enters the chambers 76 of the fold members 44A, 44B, the chambers 76 expand, or increase in volume, as the second membrane 64 stretches. This expansion exerts a reactive force (see arrows 80 in FIG. 8) that exceeds the biasing force 74, and causes the fold members 44A, 44B to move from the folded state 70 and toward the unfolded state 72. This motion causes the pneumatic shade 26 to move from the retracted position 36 and toward the extended position 40. Release of the air pressure from the chambers 76 causes the pneumatic shade 26 to reverse the motion via the biasing force 74.

The plurality of magnets 48 (see FIG. 4) may be attached to each slat 42, or every other slat, and function to hold the pneumatic shade 26 in the retracted position. In another embodiment, the biasing force 74 of the first membrane 62 may be sufficient to obviate any need for the magnets 48.

Figure 9:
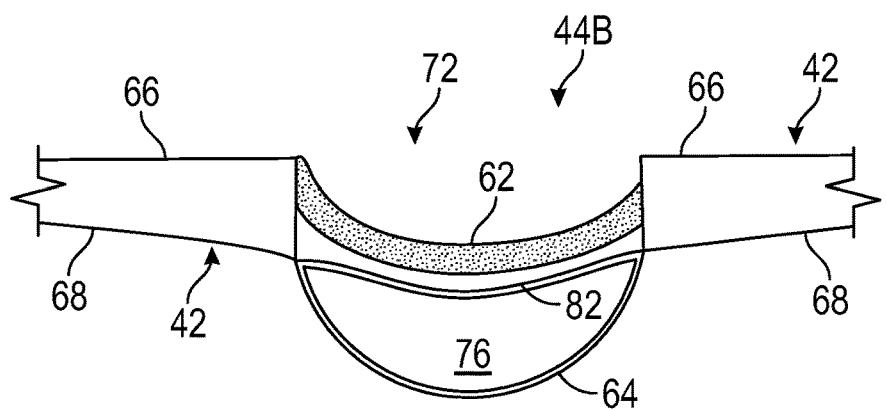
FIG. 9 is a cross section of another embodiment of a fold member illustrated in an unfolded state.

Referring to FIG. 9, another embodiment of the fold member 44B is illustrated. In this embodiment, the fold member 44B may have an additional membrane 82 disposed between the membranes 62, 64. The membranes 82, 64 comprise the bladder, and include the boundaries that define the chamber 76.

Figures 10, 11:
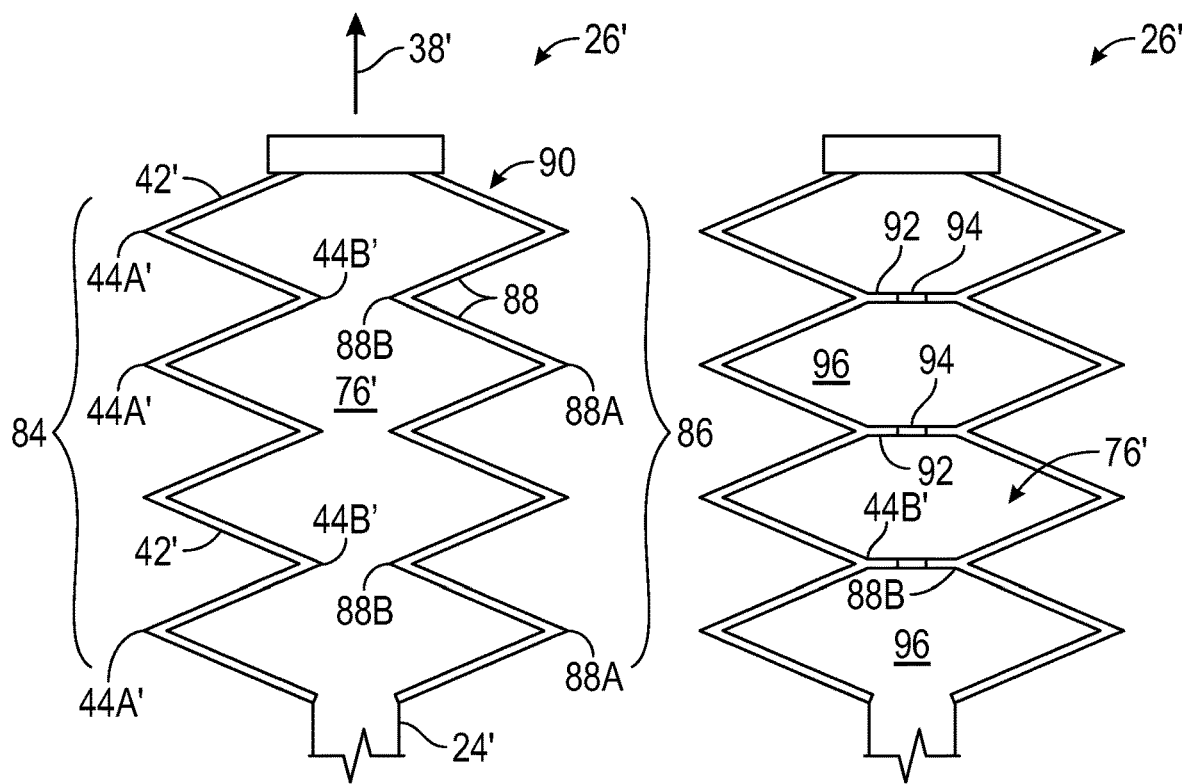
FIG. 10 is cross section of a second embodiment of a pneumatic shade.
FIG. 11 is a cross section of another embodiment of a pneumatic shade similar to FIG. 10.

Referring to FIG. 10, another embodiment of a pneumatic shade is illustrated, wherein like elements to the other embodiment(s) have like identifying numerals except with the addition of a prime symbol suffix. A pneumatic shade 26' includes a first shade side 84 and an opposite second shade side 86. The first and second shade sides 84, 86 include boundaries that define an air chamber 76'.

The first shade side 84 includes a plurality of slats 42', a plurality of outward fold members 44A', and a plurality of inward fold members 44B'. The second shade side 86 includes a plurality of slats 88, a plurality of outer fold members 88A, and a plurality of inner fold members 88B. Each inward fold member 44B' is associated with a respective inner fold members 88B, such that they are spaced from one-another, and aligned axially to one-another with respect to direction 38'. Similarly, each outward fold member 44A' is associated with a respective outer fold member 88A, such that they are spaced from one-another, and aligned axially to one-another with respect to direction 38'. Together, the first and second shade sides 84, 86 comprise an inflatable bellows 90. The inflatable bellows 90 are adapted to be in an unfolded state and extended position when inflated, and in a folded state and retracted position when deflated.

Referring to FIG. 11, another embodiment of a pneumatic shade is illustrated that is similar to pneumatic shade 26' in FIG. 10. In this embodiment, the respective inward fold members 44B' and inner fold members 88B are attached to one another, thus together forming a partition 92. At least one opening 94 communicates through each partition 92. The chamber 76' is divided by the partitions into multiple chamber portions (i.e., four illustrated each as 96). The openings 94 provide fluid communication for the flow of air between chamber portions 96.

Figure 12:
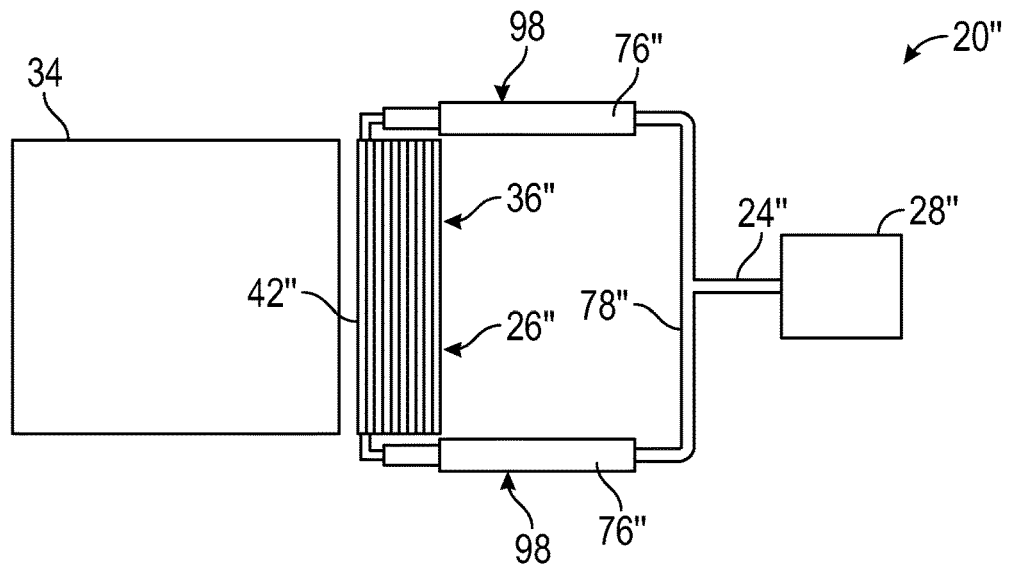
FIG. 12 is a schematic of a third embodiment of a pneumatic shade assembly.

Referring to FIG. 12, another embodiment of a pneumatic shade assembly is illustrated, wherein like elements to the other embodiment(s) have like identifying numerals except with the addition of a double prime symbol suffix. A pneumatic shade assembly 20" includes pneumatic, telescoping, air cylinders (i.e., two illustrated as 98) that generally define a variable volume air chamber 76". Each cylinder 98 is engaged between a fixed structure of a vehicle (not shown) and a leading slat 42" of a shade 26".

In operation of the pneumatic shade assembly 20", a pressurized air source 28" (e.g., compressor) delivers pressurized air via conduit 24", through a manifold 78" and to each telescoping cylinder 98. With the delivery of air, the telescoping cylinders 98 extend, causing the shade 26" to move from a retracted position 36" and to an extended position (not shown) over, or in front of, a window 34.

Figure 13:
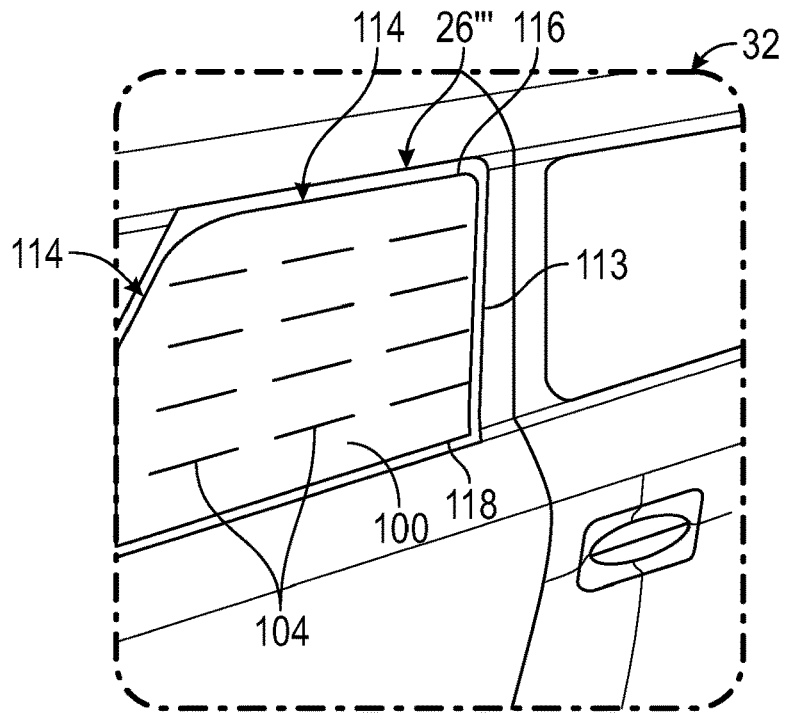
FIG. 13 is a plan view of a fourth embodiment of a pneumatic shade illustrated in a condition that limits the transmission of light.
Figure 14:
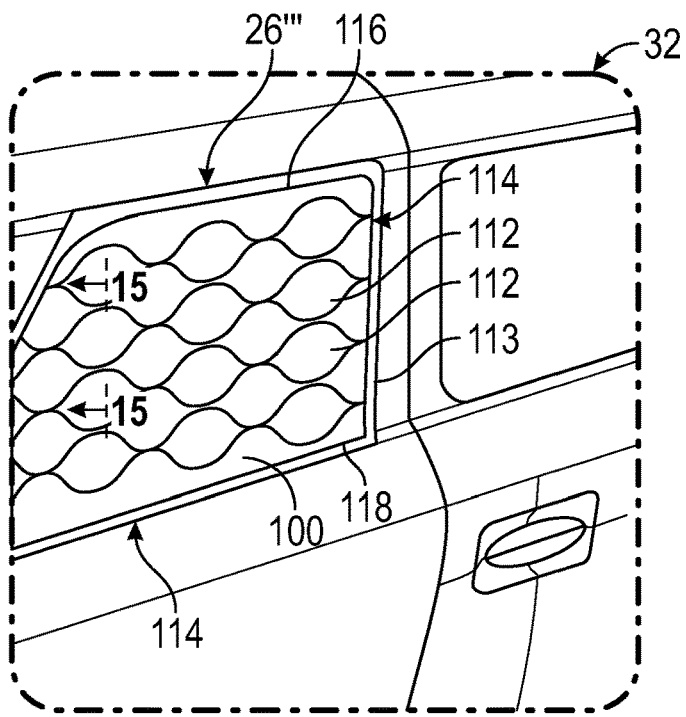
FIG. 14 is a plan view of the pneumatic shade similar in perspective to FIG. 13 and illustrated in a condition that transmits light.
Figure 15:
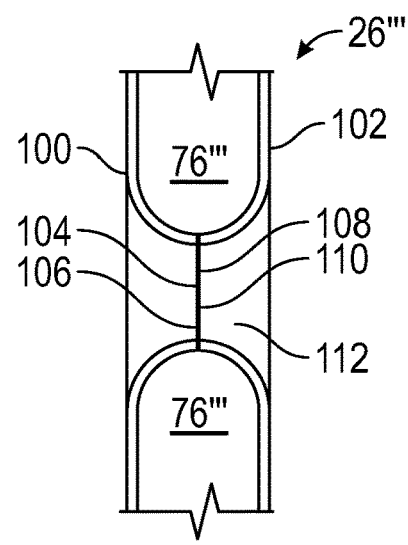
FIG. 15 is a partial cross section of the pneumatic shade taken along line 15-15 of FIG. 14 and viewing in the direction of the arrows.

Referring to FIGS. 13, 14, and 15, another embodiment of a pneumatic shade is illustrated, wherein like elements to the other embodiment(s) have like identifying numerals except with the addition of a triple prime symbol suffix. In FIG. 13, a pneumatic shade 26''' is illustrated in a condition that restricts, or prevents, the transmission of light. As best shown in FIG. 14, the shade 26''' is in a condition that maximizes the transmission of light. The pneumatic shade 26''' includes first and second membranes 100, 102 that define an expandable chamber 76''', and a frame 113. Membrane 100 includes a plurality of slits 104 each defined by a continuous perimeter 106. Similarly, membrane 102 includes a plurality of slits 108 each defined by a perimeter 110. Each one of the plurality of perimeters 106 are sealed to (i.e., attached to) a respective one of the plurality of perimeters 110, thus aligning each slit 104 to a respective slit 108.

In operation of the pneumatic shade 26''', and upon receipt of pressurized air in the chamber 76''', the chamber 76''' expands causing each of the paired slits 104, 108 to expand creating respective openings 112. The openings 112 communicate through the membranes 100, 102, thus permitting the transmission, for example, of light, or the flow of a fluid (e.g., air).

In one embodiment, the frame 113 surrounds the membranes 100, 102, and is engaged to an outer periphery 114 of the outer membranes 100, 102. Generally, the outer periphery 114 is common to both membranes 100, 102, and/or is the location where the membranes are attached to, or form to, one-another. In operation, the frame 113 functions to keep the pneumatic shade 26''' boundaries consistent and stable, thereby permitting the slits 108 to open, and preventing the periphery 114 from undesirably pulling inward when the pneumatic shade 26''' is inflated.

In another embodiment, opposite sides 116, 118 of the periphery, disposed substantially parallel to the slits 108, may be secured by the frame 113, with the remaining sides unsecured. The frame 113 may be, or may be part of, a window frame or a sunroof frame. Alternatively, the frame 113 may be an inflatable frame (i.e. a tubular chamber all around the perimeter, or at least like tubular rails along the opposite sides 116, 118) integrated into and periphery 114 which keeps the pneumatic shade 26''' from 'scrunching' together when inflated, and thereby holding the slits 108 open.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed but will include all embodiments falling within the scope thereof

What is claimed is:

1. A pneumatic shade comprising:
    a plurality of first slats, each first slat being elongated and including and spanning laterally between opposite longitudinal edges;
    a plurality of first fold members being elongated and co-extending longitudinally with the plurality of first slats, wherein each first fold member is attached to longitudinal edges of respective adjacent first slats of the plurality of first slats; and
    a plurality of second fold members being elongated and co-extending longitudinally with the plurality of first slats, wherein each second fold member is attached to longitudinal edges of respective adjacent first slats of the plurality of first slats, and are alternatingly orientated with respect to the plurality of first fold members such that each first slat spans laterally between a respective first fold member and second fold member, wherein each of the plurality of first fold members and the plurality of second fold members are configured to move between a folded state and an unfolded state upon application of pressurized air, and wherein each one of the plurality of first fold members or the plurality of second fold members are inflatable;
    wherein each one of the plurality of first fold members or the plurality of second fold members that are inflatable each include outer and inner membranes defining an air chamber;
    wherein at least one of the outer and inner membranes are resiliently flexible and configured to exert a force arranged to bias the plurality of first fold members or the plurality of second fold members that are inflatable toward the folded state;
    wherein a cross-section of each inner membrane is substantially circular when the first and second fold members are in the folded state.

2. The pneumatic shade set forth in claim 1, wherein the plurality of first slats are in a retracted position in an accordion configuration when the plurality of first fold members and the plurality of second fold members are in the folded state, and are in an extended position when the plurality of first fold members and the plurality of second fold members are in the unfolded state.

3. The pneumatic shade set forth in claim 2, wherein each slat of the plurality of first slats includes a magnet adapted to retain the plurality of first slats in the retracted position.

4. The pneumatic shade set forth in claim 2, further comprising:
    a first guide rail;
    a second guide rail spaced from the first guide rail, the plurality of first fold members and the plurality of second fold members extending longitudinally between the first and second guide rails;
    a plurality of first rollers, wherein each first roller is rotationally engaged to a first end portion of each respective one of the plurality of first fold members and the plurality of second fold members, and are adapted to roll upon the first guide rail; and
    a plurality of second rollers, wherein each second roller is rotationally engaged to an opposite second end portion of each respective one of the plurality of first fold members and the plurality of second fold members and are adapted to roll upon the second guide rail.

5. The pneumatic shade set forth in claim 1, further comprising an air conduit in fluid communication with each air chamber.

6. The pneumatic shade set forth in claim 5, wherein the air conduit is disposed normal to the plurality of first slats and is attached to each slat of the plurality of first slats.

* * * * *